(12) United States Patent
Marchesan

(10) Patent No.: US 12,010,935 B2
(45) Date of Patent: Jun. 18, 2024

(54) AGRICULTURAL HARVESTER CONTROL SYSTEM, METHOD OF CONTROLLING AN AGRICULTURAL HARVESTER AND AGRICULTURAL HARVESTER

(71) Applicant: Marchesan Implementos e Máquinas Agrícolas Tatu S.A., Matão-SP (BR)

(72) Inventor: José Luiz Alberto Marchesan, Matão-SP (BR)

(73) Assignee: MARCHESAN IMPLEMENTOS E MÁQUINAS AGRÍCOLAS TATU S.A., Matão-Sp (BR)

( * ) Notice: Subject to any disclaimer, the term of this patent is extended or adjusted under 35 U.S.C. 154(b) by 581 days.

(21) Appl. No.: 17/117,926

(22) Filed: Dec. 10, 2020

(65) Prior Publication Data
US 2021/0176911 A1 Jun. 17, 2021

(30) Foreign Application Priority Data
Dec. 13, 2019 (BR) .......................... 102019026692-9

(51) Int. Cl.
A01B 69/04 (2006.01)
A01D 69/03 (2006.01)
B62D 7/14 (2006.01)
B62D 7/15 (2006.01)

(52) U.S. Cl.
CPC ............ A01B 69/008 (2013.01); A01D 69/03 (2013.01); B62D 7/142 (2013.01); B62D 7/1509 (2013.01)

(58) Field of Classification Search
None
See application file for complete search history.

(56) References Cited

U.S. PATENT DOCUMENTS

| | | | |
|---|---|---|---|
| 2010/0071329 A1* | 3/2010 | Hindryckx | A01D 41/127 56/10.2 R |
| 2016/0041803 A1* | 2/2016 | Markov | G06F 3/147 701/48 |
| 2020/0029490 A1* | 1/2020 | Bertucci | G06V 20/58 |
| 2020/0323141 A1* | 10/2020 | Perez Ramirez | A01D 41/142 |
| 2021/0061283 A1* | 3/2021 | Hudson | B62D 7/14 |

(Continued)

OTHER PUBLICATIONS

Craessaerts et al., "Fuzzy control of the cleaning process on a combine harvester", Biosystems Engineering, vol. 106, 2010, pp. 103-111 (Year: 2010).*

(Continued)

Primary Examiner — Tamara L Weber
(74) Attorney, Agent, or Firm — Alston & Bird LLP

(57) ABSTRACT

The present invention relates to a control system for use in an agricultural harvester, the system comprising a control panel (10) configured to send at least one mode signal (11) to a control means (20) via an user's (100) command (50), the control means (20) being configured to receive the mode signal (11) and generate a set of instructions (30), the set of instructions (30) being a function of the received mode signal (11), the control means (20) being configured to control at least one piece of equipment from a set of equipment (40) of the agricultural harvester depending on the generated set of instructions (30), providing greater reliability, precision and efficiency in its operation and elimination of operational errors caused by the user.

10 Claims, 1 Drawing Sheet

(56) References Cited

U.S. PATENT DOCUMENTS

2021/0088354 A1* 3/2021 Anderson ............ G06F 3/0482

OTHER PUBLICATIONS

Macedo et al., "The Harvest Coach Architecture: Embedding Deviation-Tolerance in a Harvest Logistic Solution", Computers, Apr. 23, 2019, pp. 1-20 (Year: 2019).*

Tumenjargal et al., "Development of ISO 11783 Compliant Agricultural Systems: Experience Report", Automotive Systems and Software Engineering, Jul. 18, 2019, pp. 197-223 (Year: 2019).*

* cited by examiner

AGRICULTURAL HARVESTER CONTROL SYSTEM, METHOD OF CONTROLLING AN AGRICULTURAL HARVESTER AND AGRICULTURAL HARVESTER

CROSS REFERENCE TO RELATED APPLICATIONS

This application claims priority to and the benefit of Brazilian Patent Application No. BR102019026692-9, filed on Dec. 13, 2019; the contents of which as are hereby incorporated by reference in their entirety.

BACKGROUND

Related Field

The present invention refers to a control system for use in an agricultural harvester to allow a standardization of the control of the harvester equipment, providing greater reliability, precision and efficiency in its operation and elimination of operational errors caused by the user.

Description of the Related Art

Within the scope of the prior art related to agricultural harvesters, said harvesters are known to carry out multiple operations of different natures during their work in the field. For a common harvest work sequence there are, at least, situations of beginning of harvest, end of track, resumption of track and possible instances relative to transportation and reversal. All of these operations require different torque settings, harvester speed, actuation or interruption of certain equipment and different levels of working height.

Currently, such operating conditions are configured by the user or the operator of the agricultural machine, who is responsible for setting all the parameters required for the correct operation of the harvester at all possible scenarios. Of course, human error when defining these parameters are common, which can cause not only loss of efficiency of the harvester during its operation but can also impair the precision of maneuvers and the harvest itself, as well as, in extreme cases, cause accidents and damage to the machine.

Recurring examples are forgetfulness, recklessness, or malpractice by the user during initialization and interruption of the various agricultural machine devices; change of torque and speed modes of the traction pump or the combine's diesel engine; or height adjustment of the harvester during the different harvesting situations.

Therefore, the prior art fails to provide a control system for use in an agricultural harvester that would allow a correct execution of commands relevant to each instance of the harvester operation in a precise and reliable manner.

BRIEF SUMMARY

A first object of the present invention is to provide a control system for use in an agricultural harvester to allow one to automatically set multiple modes of operation of the harvester through simple user commands.

A second object of the present invention is to provide a control system for use in an agricultural harvester to allow one to predetermine a set of instructions and/or commands corresponding to each possible operation mode of the harvester.

A third object of the present invention is to provide a control system for use in an agricultural harvester capable of eliminating or reducing the possibility of human errors during operation of the harvester.

A fourth object of the present invention is to provide a method of controlling an agricultural harvester that uses the aforementioned system.

A fifth object of the present invention is to provide an agricultural harvester that uses the aforementioned system.

The objects of the present invention are achieved by a control system for use in an agricultural harvester, the system comprising a control panel configured to send at least one mode signal to a control means via user's command, the control means being configured to receive the mode signal and generate a set of instructions, the set of instructions being a function of the received mode signal, the control means being configured to control at least one piece of equipment of a set of equipment of the agricultural harvester as a function of the generated set of instructions.

In a possible embodiment, the mode signal is at least one transport mode signal, the set of instructions comprising at least one of the instructions of: changing the engine rotation of an agricultural harvester to a transport rotation; preventing the reception, by the control panel, of at least one type of mode signal; interrupting the operation of at least one piece of equipment from the set of equipment; and/or setting the mode of operation of a harvester traction pump for greater speed.

In another possible embodiment, the mode signal is at least one start of harvest mode signal, the set of instructions comprising at least one from the following instructions: changing the engine rotation of an agricultural harvester to a transport rotation; setting the mode of operation of a harvester traction pump for greater torque; starting the operation of at least one piece of equipment from the set of equipment; setting the working height of the harvester structure; and/or enabling steering modes.

In another possible embodiment, the mode signal is at least one end-of-track mode signal, the set of instructions comprising at least one from the following instructions: changing the engine rotation of the agricultural harvester to an end-of-track rotation; setting the mode of operation of a harvester traction pump for greater torque; interrupting the operation of at least one piece of equipment from the set of equipment; setting the working height of the harvester structure; and/or enabling driving modes.

In another possible embodiment, the mode signal is at least one resumption-of-track mode signal, the set of instructions comprising at least one from the following instructions: changing the engine rotation of the agricultural harvester to a resumption-of-track rotation; setting the mode of operation of a harvester traction pump for greater torque; starting the operation of at least one piece of equipment from the set of equipment; setting the working height of the harvester structure; and/or enabling driving modes.

In another possible embodiment, the mode signal is at least one reversal mode signal, the set of instructions comprising at least one from the following instructions: changing the engine rotation of an agricultural harvester to a transport rotation; setting the mode of operation of a harvester traction pump for greater torque; starting the operation of at least one piece of equipment from the set of equipment in a reverse sense of operation; and/or enabling steering modes.

In another possible embodiment, the mode signal is at least one crab-steering mode signal, the set of instructions comprising at least one from the following instructions: reading at least one angle sensor arranged on the harvester axes; and/or actuating at least one valve to angle the harvester wheels according to the reading obtained from the angle sensor.

In another possible embodiment, the mode signal is at least one of the following signals: transport mode; start of harvest mode; end of track mode; resumption of track mode; reversal mode; and/or crab steering mode.

The present invention further provides a method of controlling an agricultural harvester of the type that comprises a control system such as the one mentioned above, the method comprising the steps of: receiving, through the control panel, a user command; sending a mode signal to the control means depending on the user command; generating, through the control means, a set of instructions depending on the received mode signal; and controlling, through the control means, at least one piece of equipment from a set of equipment according to the generated set of instructions.

The present invention further provides an agricultural harvester comprising a control system such as the one mentioned above.

BRIEF DESCRIPTION OF THE FIGURES

The present invention will now be described in more detail based on an exemplary embodiment shown in the drawings. The figures show.

DETAILED DESCRIPTION OF VARIOUS EMBODIMENTS

Figure 1:
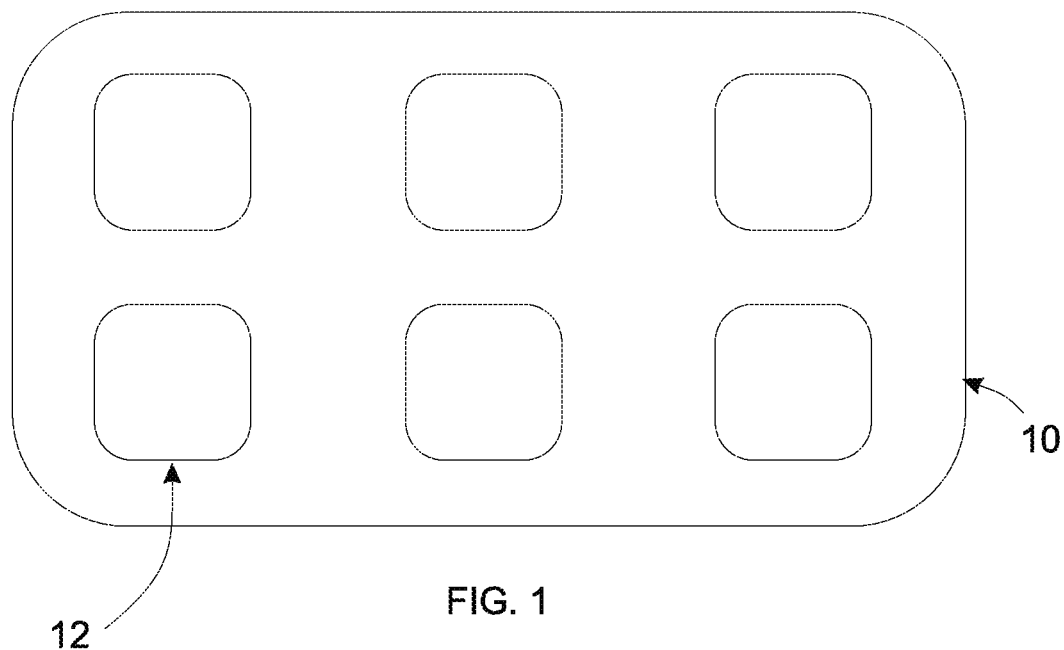
FIG. 1—is a schematic representation of the control panel of the system of the present invention in a preferred configuration.
Figure 2:
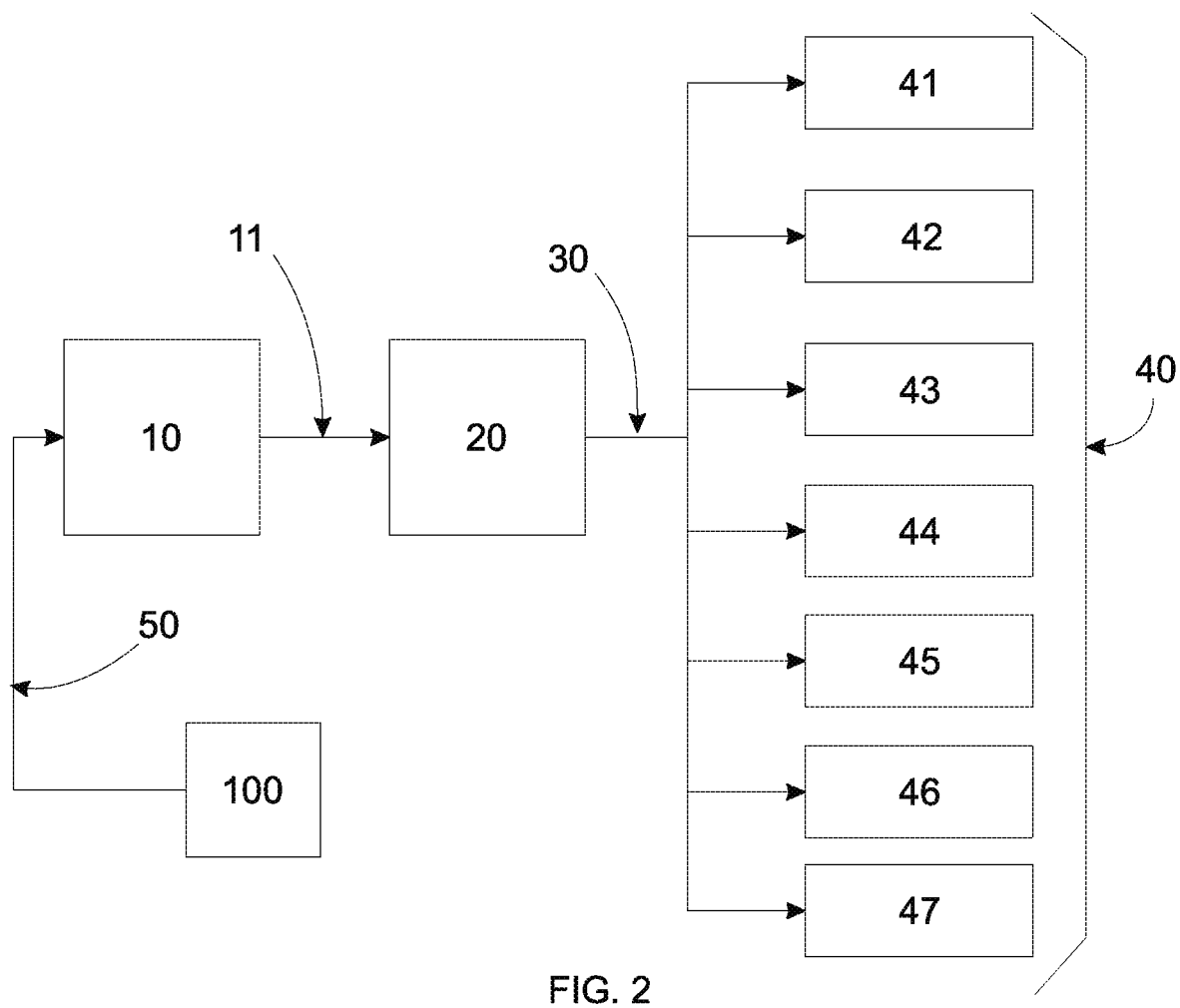
FIG. 2—is a schematic representation of the system of the present invention in a preferred configuration.

FIG. 1 shows the control panel of the system of the present invention in a preferred configuration and FIG. 2 discloses a representation of the system of the present invention in a preferred configuration. It should be noted that the term "preferred" should not be understood as mandatory or obligatory, being only intended to characterize a possible and particularly efficient embodiment of the present invention.

The system of the present invention comprises a control panel 10 accessible and operable by the user 100. The control panel 10 is configured to send a mode signal 11 to a control means 20 by means of a command 50 from the user 100. The command 50 from the user 100 and the mode signal 11 are depicted in FIG. 2 by the respective indicator arrows. Preferably, the control panel 10 comprises means of command 12 to allow the selection, by the user 100, of the desired command. Such means 12 can be, for example, buttons, keys, levers, or an electronic and/or digital interface to allow the user's interaction 100 through a screen. In another possible embodiment, the control panel 10 can be a mobile or peripheral device electronically connected to the control means 10, either by a wired or wireless connection that is either remote or not.

The mode signal 11 is meant to be an electrical or electronic signal generated by the control panel 10, which corresponds to a command performed by the user 100, preferably through means 12. Preferably, the control panel 10 is configured to provide the user 100 with a plurality of command options through means of command 12, which options represent, in a possible embodiment, multiple modes of operation of the harvester. Therefore, the control panel 10 is capable of generating a plurality of mode signals 11, one for each command option 50 available to the user.

The control means 20, in turn, is configured to receive the mode signal 11 generated by the control panel 10 and generate a set of instructions 30, which set is represented in FIG. 2 by an indicator arrow. The term "instruction" must be understood as one or more electronic or digital signals that can determine the behavior of the control means 20 or other devices of the system of harvester. For example, an instruction generated by the control means 20 can be directed towards the control means itself 20 so that it manages the control of one or more equipment of the agricultural machine through electrical signals. Alternatively, an instruction can be directly sent to equipment of the agricultural machine, which, when configured to do so, can interpret such instructions and configure their own behavior through an electronic logic. Such relationships of sending and receiving instructions can be implemented in any known and effective ways, including via utilization of a controller (computerized or the like) as the control means 20.

The set of instructions 30 is a function of the mode signal 11 received by the control means 20. In other words, the type of instruction generated by the control means 20 depends on the type of mode signal 11 received by the control means 20. Thus, a set of instructions 30 will be specifically connected to a mode signal 11, in accordance with the command 50 performed by the user at the control panel 10.

In addition, the control means 20 is configured to control at least one piece of equipment from a set of equipment 40 of the agricultural harvester according to the set of instructions 30 generated. In this sense, as already explained above, the control means is capable of generating a set of instructions 30 that can become multiple commands, whether directed to the control means itself 20 or the agricultural machine equipment. From this set of instructions 30, the control means 20 determines a series of commands to be followed by each equipment of a set of equipment 40 of the agricultural machine, effectively controlling the behavior of the set 40. In addition, as also explained above, each set of instructions 30 is generated according to the specific type of mode signal 11 generated by the control panel 10 by means of the user's 100 command 50, such that there are as many ways of controlling the set of equipment 40 as there are possible commands 50 to be sent by the user.

Thus, the system of the present invention establishes a dependency relationship between the user's command 50 through the control panel 10, a mode signal 11 generated by the control panel 10 and the set of instructions 30 generated by the control means 20 depending on the mode signal 11.

In this sense, the mode signal 11 represents, preferably, a specific mode of operation of the agricultural harvester for a given work situation. In one possible embodiment, the mode signal 11 can be at least one of the following: transport mode; start of harvest mode; end of track mode; resumption of track mode; reversal mode; and/or crab steering mode.

Thus, the control panel 10 can, in a possible configuration, comprise a control means 12 for each operating mode available to the user 100. When choosing a particular mode by the control panel 10, a mode signal 11 corresponding to that mode chosen by the user 100 is generated and sent to the control means 10.

The control means 10, in turn, generates a set of instructions 30 corresponding to the mode signal 11, that is, corresponding to the mode chosen by the user 100 in the control panel 10. The set of instruction 30 comprises instructions relative to the chosen mode and that allows the control means 10 to control, that is, to determine the behavior of the set of equipment 40 of the agricultural machine for the correct implementation of the mode of operation chosen.

Then, features of each set of instructions 30 that can derive from the aforementioned mode signals 11 are detailed below for a better understanding of the operation of the present invention.

A "transportation" mode signal 11 can generate a set of instructions 30 containing the following instructions: changing the engine rotation 41 of an agricultural harvester to a transport rotation; preventing the reception, by the control panel 11, of at least one mode signal 11; interrupting the operation of at least one piece of equipment from the set of equipment 40; and setting the mode of operation of a harvester traction pump 42 for greater speed.

More specifically, in transportation mode, the control means 20 controls the engine 41 of the agricultural harvester to establish a predefined travel speed for transportation, or even to establish a maximum predefined transportation speed, which is preferably 22 km/h. As a safety measure in this mode, more preferably, at least one harvester tool is disabled, and, preferably, the entire set of machine tools is disabled together with the crab steering and reduced turning radius modes, so that unwanted actuations during the transfer of the machine and sudden maneuvers at high speed are prevented, which may cause the machine to tip over and, accordingly, impose risks to the operator's physical integrity.

The term "set of tools" should be understood as machine equipment that effectively acts on the harvesting and processing of sugarcane, such as a tip cutting device 43, base cutting 44, tilting and lifting rollers 45, feeding belt 46 and chipper 47. The hydraulic traction pump 42 can be controlled, for example, by adjusting its tilt plate.

A "start of harvest" mode signal 11 can generate a set of instructions 30 containing the following instructions: changing the engine 41 rotation of an agricultural harvester to a start of harvest rotation; setting the mode of operation of a harvester traction pump 42 for greater torque; starting the operation of at least one piece of equipment from the set of equipment 40; setting the working height of the harvester structure; and enabling steering modes.

More specifically, in such a start of harvest mode, rotation of the diesel engine is set to high values, preferably around 2,000 RPM, and at least one harvester tool is actuated, preferably all hydraulic circuits of the set of tools 43-47 are actuated. Actuation of the tools is carried out sequentially in the above-described order and, preferably, at a predetermined time interval between one actuation and the other, which is more preferably of 1 second. Even more preferably, the set of tools can act according to pre-established parameters for that specific application or harvest. Instructions also control the adjustment of working height of the base cutting structure, or even wait for the user to define that height manually. Finally, a steering mode is enabled, which can be understood as a mode that allows the user to freely steer the harvester.

An "end-of-track" mode signal 11 can generate a set of instructions 30 containing the following instructions: changing the engine 41 rotation of the agricultural harvester to an end-of-track rotation; setting the mode of operation of a harvester traction pump 42 for greater torque; interrupting the operation of at least one piece of equipment from the set of equipment 40; setting the working height of the harvester structure; and enabling driving modes.

In such an end-of-track mode, instructions control the deactivation of at least one harvester tool, preferably, the entire set of tools 43-47 of the harvester is deactivated, and more preferably in the reverse order of the "start of harvest" mode. Further, the base cut structure is raised to the maximum and engine rotation is reduced to the predetermined value for this mode, hence allowing the operator to safely maneuver the machine, positioning it to harvest the next sugarcane track. Also, the steering mode is enabled, or remains enabled.

A "resumption-of-track" mode signal 11 can generate a set of instructions 30 containing the following instructions: changing the engine rotation 41 of the agricultural harvester to a resumption-of-track rotation; setting the mode of operation of a harvester traction pump 42 for greater torque; starting the operation of at least one piece of equipment from the set of equipment 40; setting the working height of the harvester structure; and enabling steering modes.

In such a resumption-of-track mode, at least one harvester tool is actuated once again, and, preferably, all hydraulic circuits of the set of machine tools 43-47 are actuated in the same order as indicated in the "start of harvest" mode, in addition to returning to the height of the base cut structure to the working position as predefined, allowing the operator to start the harvesting process once again.

A "reversal" mode signal 11 can generate a set of instructions 30 containing the following instructions: changing the engine 41 rotation of an agricultural harvester to a start of harvest rotation; setting the mode of operation of a harvester traction pump 42 for greater torque; starting operation of at least one piece of equipment from the set of equipment 40 in a reverse sense of operation; and enabling steering modes.

For such a reversal mode, if the harvester gets stuck during operation, an alarm informing the site where it got stuck will be shown on the control panel 10 or on another harvester display device, regardless of the cause, whether caused by garbage in the sugarcane fields, stones or even because of a sugarcane field of variable density. Reversal mode instructions command the hydraulic circuits of at least one tool 43-47 to have their directions reversed. Preferably, reverse actuation is controlled for specific tools and in a sequential order, namely: base cutting 44, tilting and lifting rollers 45, feeder belt 46 and chipper 47, still preferably at a predetermined time interval between one actuation and the other, more preferably of 1 second. This allows the material trapped in the harvester tools to be expelled and removed from the work area. This function offers to the operator full conditions to carry out the entire act of unloading the machine inside the cabin, without being exposed to inherent risks, making the operation easy to access and safe.

Moreover, a "crab-steering" mode signal 11 can generate a set of instructions 30 containing the following instructions: reading at least one angle sensor arranged on the harvester axes; and actuating at least one valve to angle the harvester wheels according to the reading obtained from the angle sensor.

More specifically, instructions of the crab-steering mode configure the steering of 4 wheels of the harvester to the same direction, allowing the operator to perform the side displacement of the machine on slopes, windrows and ditches. In this configuration, the tires act as barriers that prevent the machine from sliding, and the harvest can be carried out safely in difficult to access areas. The sensors act to enable the axis angles to be read and to change the angle of the wheels in accordance with the angle read by the sensors.

Notwithstanding the modes shown above, the mode signals 11 generated by the control panel 10 can be relative to any other desired operating modes of the harvester. Other examples of possible mode signals 11 are: reduced turning radius steering mode; traction lock mode; mode of individual actuation of line dividers; mode of actuation or interruption of line dividers; mode of direct/reverse actuation for cutting tips; windsock driving mode; and mode of actuation of side cutting discs.

Having presented examples of possible modes of operation and the operation of the system of the present invention in accordance with these modes, it is evident that the present invention is capable of automating the configurations of the various modes of operation of the harvester by transferring the responsibility from the operator to the system and providing greater accuracy, reliability and efficiency in the required adjustments to each mode and in the process of harvesting sugarcane in general. In addition, the risk of failures caused by the operator itself is substantially eliminated or reduced, if only the operator chooses one of the modes available for the system itself to generate and execute instructions relative to that mode and set the machine accordingly without any human intervention.

In accordance with the above system, the present invention further proposes a method of controlling an agricultural harvester of the type comprising the aforementioned system, the method comprising the following steps: receiving, through the control panel 10, a user command; sending to the control means 20 a mode signal 11 depending on the user command; generating, through the control means 20, a set of instructions 30 depending on the received mode signal 11; and controlling, through the control means 20, at least one piece of equipment from a set of equipment 40 according to the generated set of instructions 30.

Furthermore, in accordance with the above, the present invention also provides for an agricultural harvester that comprises the aforementioned system.

Having described one example of a preferred embodiment, it should be understood that the scope of the present invention encompasses other possible variations thereof, being limited only by the content of the appended claims, including any possible equivalents thereof.

The invention claimed is:

1. A control system for use in an agricultural harvester, the control system comprising:
    a control panel (10) configured to send at least one mode signal (11) to a controller (20) via an user's (100) command (50), the mode signal (11) being at least one of an end-of-track mode signal or a resumption of track mode signal, the controller (20) being configured to receive the mode signal (11) and generate a set of instructions (30), the set of instructions (30) being a function based upon the received mode signal (11),
    wherein the set of instructions (30) comprises at least one from the following:
        an instruction that changes the engine (41) rotation of the agricultural harvester to a start of harvest rotation when the resumption of track mode signal is received; or
        an instruction that changes the engine (41) rotation of the agricultural harvester to an end-of-track rotation when the end-of-track mode signal is received; and
    wherein the controller (20) respectively and automatically collectively:
        starts the operation of or interrupts the operation of at least one piece of equipment from a set of equipment (40) of the agricultural harvester based upon the generated set of instructions (30);
        raises or lowers a working height of the at least one piece of equipment from the set of equipment (40) of the agricultural harvester based upon the generated set of instructions (30); and
        reduces or raises an engine (41) rotation to provide one of greater torque or greater speed based upon the generated set of instructions (30).

2. The control system according to claim 1, wherein:
the mode signal (11) further includes at least one transportation mode signal, and
the set of instructions (30) further comprises at least one from the following instructions:
changing the engine (41) rotation of an agricultural harvester to a transportation rotation;
preventing the reception, by the control panel (11), of at least one mode signal (11);
interrupting operation of at least one piece of equipment from the set of equipment (40); or
setting the mode of operation of a harvester traction pump (42) for greater speed.

3. The control system according to claim 1, wherein:
the mode signal (11) further includes at least one start of harvest mode signal, and the set of instructions (30) further comprises at least one from the following instructions:
changing the engine (41) rotation of the agricultural harvester to a start of harvest rotation;
setting the mode of operation of a harvester traction pump (42) for greater torque;
starting the operation of at least one piece of equipment from the set of equipment (40);
setting the working height of the harvester structure; or
enabling steering modes.

4. The control system according to claim 1, wherein:
the set of instructions (30) further comprises at least one from the following instructions:
setting the mode of operation of a harvester traction pump (42) for greater torque;
raising the working height of the harvester structure to a maximum height; or
enabling steering modes.

5. The control system according to claim 1, wherein:
the set of instructions (30) further comprises at least one from the following instructions:
setting the mode of operation of a harvester traction pump (42) for greater speed;
lowering the working height of the harvester structure from a maximum height to a predefined operational height; or
enabling steering modes.

6. The control system according to claim 1, wherein:
the mode signal (11) further includes at least one reversal mode signal, and
the set of instructions (30) further comprises at least one from the following instructions:
changing the engine (41) rotation of the agricultural harvester to a start of harvest rotation;
setting the mode of operation of a harvester traction pump (42) for greater torque;
starting the operation of at least one piece of equipment from the set of equipment (40) in a reverse sense of operation; or
enabling steering modes.

7. The control system according to claim 1, wherein:
the mode signal (11) further includes at least one crab-steering mode signal, and
the set of instructions (30) further comprises at least one from the following instructions:

reading at least one angle sensor arranged on the harvester axes; or actuating at least one valve to angle the harvester wheels according to the reading obtained from the angle sensor.

8. The control system according to claim 1, wherein the mode signal (11) further includes at least one of the following signals: transportation mode; start of harvest mode; reversal mode; or crab steering mode.

9. A method of controlling an agricultural harvester that comprises the control system of claim 1, wherein the method comprises the steps of:

receiving, through the control panel (10), a user's command;

sending to the controller (20) a mode signal (11) depending on the user's command;

generating, through the controller (20), a set of instructions (30) depending on the received mode signal (11); and controlling, through the controller (20), at least one piece of equipment from a set of equipment (40) according to the generated set of instructions (30).

10. An agricultural harvester comprising a control system as defined in claim 1.

* * * * *

UNITED STATES PATENT AND TRADEMARK OFFICE
CERTIFICATE OF CORRECTION

PATENT NO. : 12,010,935 B2
APPLICATION NO. : 17/117926
DATED : June 18, 2024
INVENTOR(S) : José Luiz Alberto Marchesan Page 1 of 1

It is certified that error appears in the above-identified patent and that said Letters Patent is hereby corrected as shown below:

In the Claims

In Column 8, Line 14, Claim 2, delete "(11)," and insert -- (10), --, therefor.

Signed and Sealed this
Eighth Day of April, 2025

Coke Morgan Stewart
*Acting Director of the United States Patent and Trademark Office*